UNITED STATES PATENT OFFICE.

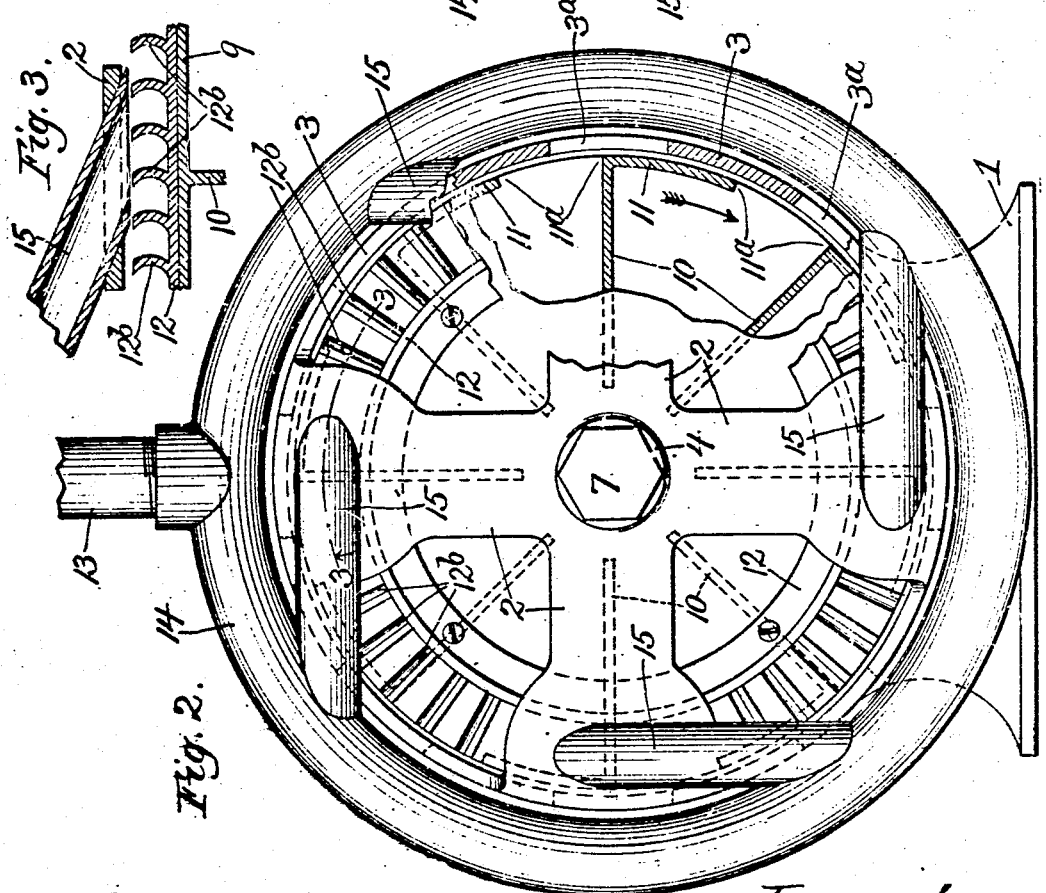

JOHN K. STEWART, OF CHICAGO, ILLINOIS.

AUTOMOBILE-ALARM.

No. 869,941.	Specification of Letters Patent.	Patented Nov. 5, 1907.

Application filed May 24, 1906. Serial No. 318,465.

*To all whom it may concern:*

Be it known that I, JOHN K. STEWART, a citizen of the United States, residing at Chicago, in the county of Cook and State of Illinois, have invented new and useful Improvements in Automobile-Alarms, of which the following is a specification, reference being had to the accompanying drawings, forming a part thereof.

The purpose of this invention is to provide a device adapted to sound a long-distance alarm to be given by an automobile utilizing the device, being of the nature of a siren operated by the exhaust from the vehicle motor, from which it will be understood that it is designed to be used on vehicles employing a fluid motor, either explosive or steam engine. It consists of the features of construction and combination set out in the claims.

In the drawings:—Figure 1 is a vertical axial section of a device embodying this invention. Fig. 2 is a rear side elevation of the same. Fig. 3 is a section at the line 3—3 on Fig. 1.

The construction of the siren wheel itself, so far as its capacity for producing sound is concerned, is shown and claimed in my pending application, Serial No. 308,390, filed March 28, 1906, and the device in that respect is not claimed in this application. Certain details of the mounting of the siren wheel in its case are modified in adapting it to be operated in the manner involved in the present invention, and for the purpose of these features it will be described. A supporting standard or base, 1, adapted to be mounted in any convenient manner upon the body of the vehicle, supports the case of the siren wheel, which may be integral with the base. This case comprises a skeleton diaphragm or spokes, 2, connecting the peripheral flange, 3, with a central stud or bearing piece, 4, which supports the bearings of the shaft, 5, of the siren wheel. A desirable construction for this post is that shown, in which it is open axially from end to end, and has screwed into its opposite ends the ball-retaining elements, 6 and 7, respectively, of the ball bearings for the shaft, 5, the shaft being first inserted through the hollow stud and post and being followed by the balls and their retaining elements, 6 and 7, the shaft protruding from the element, 6, at the outer side of the case to receive the siren wheel, whose hub, 8, is axially bored to fit and be pinned onto the protruding reduced end of the shaft, 5, and is further constructed hollow, with suitable diameter to admit the post, 4, over which it is passed in order to receive the protruding end of the shaft, to which it is made fast by a pin, 5ª, as illustrated. The siren wheel, in addition to its hollow hub just described, comprises the diaphragm or back plate, 9, radial vanes, 10, 10, and an apertured peripheral flange consisting of the short segments, 11, 11, extending circumferentially one way from the ends of the several vanes, leaving apertures, 11ª, between the end of each and the next vane corresponding to apertures, 3ª, in the circumferential flange, 3, of the siren wheel case, which are readily opened and closed by the rotation of the siren wheel within the case as the flange segments, 11, 11, alternately cover and uncover these apertures, causing, when the rotation is sufficiently rapid, a musical note with pitch varying with the speed, and loudness varying with the size of the device and the speed. On the back of the diaphragm, 9, of the siren wheel, there is mounted and may be formed integrally a turbine motor element or wheel, 12, which, as illustrated, is an annular device, so made because it is to be mounted on the siren wheel and carried by the same bearings. This turbine element comprises an annular series of substantially or approximately radial pocket vanes or ribs, 12ᵇ, for receiving the impact and impulse of the exhaust jet from the vehicle motor, which may be directed against this turbine element for rotating it and the siren wheel rigid with which it is formed or mounted. The particular construction of this turbine element for the purpose of serving as a motor for the siren wheel is not claimed in this application, but only its association with the siren wheel and in the manner and for the purpose indicated. Upon each, or upon as many as desired, of the spokes, 2, constituting the skeleton diaphragm of the siren wheel case, there is mounted a jet nozzle, 15, which trends obliquely with respect to the plane of rotation of the wheel and turbine element for directing a fluid jet into or against the pocket vanes for imparting rotary motion to the device. The discharge end of the nozzle is beveled off so that it lies against and covers a considerable number of the pocket vanes for directing the jet into them and the exhaust from them taking place readily, the reaction against the air in such exhaust operating as a driving force upon the pockets as well as the direct impact of the jet.

The particular form of motor wheel for operation by the fluid jet is subject to modification, not being itself a part of the present invention.

13 represents a pipe for conducting the exhaust fluid from the vehicle motor (not shown) to the nozzles; and for so conducting the fluid to all the nozzles, it is connected directly to an annular pipe, 14, to which all the nozzles are connected at their base. This pipe may be formed as an integral part of the skeleton diaphragm of the case.

I claim:—

1. An alarm-sounding device for a fluid-motor-propelled vehicle, comprising a siren wheel and its case adapted to be sounded by the air drawn into the siren wheel by its own rotation and having peripheral apertures for the discharge of the air to produce the sound; a fluid-operated motor element rigid with such siren wheel independent of the sound-producing device of the latter and having its passages non-communicating with the air passages of the siren wheel, and fluid-jet nozzles mounted on the siren-wheel case for directing jets against the motor element.

2. An alarm device for a fluid-motor-propelled vehicle comprising a siren wheel and its case, the siren wheel and case being open at the center of one side for drawing air into the siren wheel by its own rotation and having peripheral apertures for discharge of the air to cause the sound; a fluid-operated motor mounted upon the back or closed side of the siren wheel without communication with the air passages of the latter, and having water-receiving pockets opening away from said closed side of the wheel and toward the closed side of the case, and fluid-jet nozzles mounted on the case for directing jets into the motor-element pockets, the case having peripheral apertures for exhaust of the motive fluid through the pockets.

In testimony whereof, I have hereunto set my hand at Chicago, Illinois, this 19th day of May, A. D. 1906.

JOHN K. STEWART

Witnesses:
 CHAS. S. BURTON.
 M. GERTRUDE ADY.